US006480501B1

(12) United States Patent
Blanc et al.

(10) Patent No.: US 6,480,501 B1
(45) Date of Patent: Nov. 12, 2002

(54) PROCESS FOR TRANSPORTING A CELL THROUGH A SWITCHING STRUCTURE BASE ON A SINGLE STAGE SWITCH

(75) Inventors: Alain Blanc, Vence (FR); Jean-Claude Abbiate, La Guade (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,903

(22) Filed: Jun. 19, 1998

(30) Foreign Application Priority Data

Dec. 30, 1997 (EP) ............................................ 97480098

(51) Int. Cl.[7] .............................................. H04L 12/54
(52) U.S. Cl. ......................... 370/422; 370/396; 370/398
(58) Field of Search ................................ 370/351, 389, 370/422, 270, 399, 409, 398, 400, 425, 404, 395.1, 395.2, 396, 397, 905

(56) References Cited

U.S. PATENT DOCUMENTS 6,167,054 A * 12/2000 Simmons et al.
6,252,877 B1 * 6/2001 Kozaki et al.
6,278,714 B1 * 8/2001 Gupta

* cited by examiner

*Primary Examiner*—William Luther
(74) *Attorney, Agent, or Firm*—John J. Timar; John B. Schelkopf

(57) ABSTRACT

A process for transporting a data cell throughout a switch fabric having a centralized switching structure and a set of distributed, generally remotely located, Switch Core Access Layers (SCAL) permitting the attachment of the protocol adapters. Remotely with respect to the centralized switching structure, the data cell which is received from a telecommunications link is divided into k logical units (LUs) and additional bytes are introduced for permitting the reservation of a bitmap field that will be used for routing through the switch core. Every LU is coded in accordance with the 8B/10B coding process. Within the centralized switching structure, the k coded LUs are deserialized and the cell clock is obtained for each cell in order to reconstitute the data cell. In addition the routing byte reservations are filled with appropriate values (bit map) for the routing process within the switch by means of an access to an entry routing table. When the cell outputs the switching structure, a second access to a routing table permits the replacement of the previous bit map by new values in order to enhance multicast capabilities. The data cell is divided again in a set of k serialized logical units (LUs) in order to prepare a serialization through k links. The LUs are coded as previously to permit the merging of the LUs when different sets of switches operated in parallel are connected in a port expansion mode. Remotely with respect to the switch core, the coded LUs are deserialized and the data cell is reconstituted by means of the deserialization and extraction of the data cell clock transported by the 8B/10B coding process. The newly inserted values of the bit map are then used for enhancing multicasting capabilities.

4 Claims, 1 Drawing Sheet

PROCESS FOR TRANSPORTING A CELL THROUGH A SWITCHING STRUCTURE BASE ON A SINGLE STAGE SWITCH

TECHNICAL FIELD

The invention relates to the telecommunications field and, more particularly, to a process for transporting a cell through a switching structure which is based on a single stage switch.

BACKGROUND ART

Patent applications EP 96480126.0 (IBM Docket FR996040), EP 96480125.2 (IBM Docket FR996041), EP 96480117.9 (IBM Docket FR996042), and EP 96480120.3 (IBM Docket FR996045) are nonpublished prior European applications representing examples of powerful self-routing switches that provide high switching speed.

Powerful telecommunications switches operating at speeds greater than hundreds of Gigabits per second are now developed. The data which are to be switched by these elements are generally provided from telecommunications links, such as X25, which are generally located at a distance greater than a hundred meters from the switching structure. Such distances are attributable to the fact that the different telecommunications links are located in different parts within an industrial area, e.g. a manufacturing site of a company.

Additionally, the data which is to be switched today takes the form of data cells, generally of a given length, which may of course comply with the well-known Asynchronous Transfer Mode (ATM) format. This cell generally comprises, in addition to the payload containing the useful data to be transported, a routing header that is used for determining the direction to be taken within the switching structure. However the generally small size of the cell prohibits the header from having a large size, jeopardizing the efficiency of the switch. This theoretically limits the possibilities of the routing processing, and particularly the multicasting possibility.

In addition, since the different points of entry and output of the switch are located at different locations, that may be separated by a distance of greater than one hundred meters, the data cells have to be serialized at a given location in order to permit this transport within the area of the industrial site, which also results in difficulties for providing cell synchronization.

Furthermore, the data cells have to be converted to a form that is particularly adapted to the structure of the switching element, i. e., the switch core, which will route the cells to the appropriate direction.

SUMMARY OF THE INVENTION

The problem to be solved by the invention is to provide a process for transporting a data cell, entered at a remote point within an industrial premises, throughout a switching structure which is based on a single stage switch, and to route the cell towards the appropriate direction to a point that is located in a second remote area. Since the size of the cell is small and the power of the switch is high, the process must not jeopardize the efficiency of the switching structure. A number of formatting steps on the cells is included for permitting an appropriate manipulation of the data cell at the different levels of the switching structure, particularly including serialization/deserialization, the routing process and the correction for the difference in the transport times within the local switching structure.

This problem is solved by the present invention as defined in claim 1. Basically the process comprises a number of formatting steps that allow the data cell to be structured and that presents a form permitting an efficient transport throughout the entire switching structure, i.e., the switch fabric. Thus, the cell automatically passes through the different elements of the switching structure and is routed to the appropriate elements.

Remotely with respect to the switch core (i.e., the switching part of the switch fabric that is generally located in one building of the industrial site), the data cell which is received from a telecommunications link is formatted in order to permit the transport through k serialized link lines to the local switching structure. This formatting includes dividing the cell in k logical units (LUs) and adding routing bytes, that is to say extra bytes that are specially reserved for preparing the routing process throughout the switching structure. In addition, the k logical units are coded by means of the 8B/10B coding process in order to permit the cell clock transport within each serialized link. In order to preserve the bandwidth, the coding is such that a comma character is introduced in each empty cell so that the size of the useful data cell is not affected.

Locally, within the switch core, the k coded LUs which enter the local switching structure are then deserialized and the cell clock is obtained for each cell in order to reconstitute the data cell. In addition, at this point, reservations for the routing bytes are filled with their appropriate values (bit map) that will be used for the routing process within the switch by means of an access to an entry routing table.

In the case where the switch core is based on m switching elements operating in parallel (speed expansion mode), the data cell is divided into m separate data fields which can be entered within the m parallel switching elements. The bit map is used for controlling the routing process.

Locally, when the cell outputs the switching structure, a second access to a routing table permits the replacement of the previous bit map by new values in order to enhance multicast capabilities.

The data cell is then divided again in a set of k serialized Logical Units (LUs) in order to prepare a serialization through k links. The LUs are then coded by means of the 8B/10B coding process and comma characters are introduced again. The comma characters which are introduced can be used for providing LU merging process when different sets of switches operated in parallel are connected in a port expansion mode.

Remotely with respect to the switch core, the coded LUs are deserialized and the data cell is reconstituted by means of the deserialization and permitted by the reconstitution of the data cell clock transported by the 8B/10B coding process. The newly inserted values of the bit map are then used for enhancing multicasting capabilities.

The reservations for routing bytes can then be suppressed before the cell is provided to the telecommunications link by means of an appropriate Protocol Engine.

It appears that, from a remotely located entry point in a switching structure and up to a second remotely located point and passing through the local switch core, there is provided a packing process of the cell which gives it the appropriate form at every level within the switch fabric so that it can very quickly be routed towards the appropriate direction port.

The reservations for routing bytes which is introduced at the entry point of the switch fabric and suppressed before it is outputted from the switch fabric, and which at two different levels is replaced by appropriate routing values, permits the cell to keep a maximum size for transporting useful data and for preserving the bandwidth. The use of comma characters inside empty cells enhances this advantage, and further, provides the possibility to synchronize the cells (in the form of LUs), that come from different switching structures connected in port expansion mode.

These advantages are provided by means of the very efficient cooperation of the routing bit reservation, which can be replaced at different steps by the appropriate bit map value, with the 8B/10B bit coding process and the introduction of the comma characters inside the empty cells which are used as well as for LU synchronization and different in transport times within the local switch cores. A very efficient packing method for the data cell is provided so that the data cell can be transported and processed throughout the switch fabric structure, the overall processing comprising serialization/deserialization, routing and multicasting, and time compensation in the transport of the cell in the local switch core when operating in port expansion mode.

DESCRIPTION OF THE PREFERRED EMBODIMENT OF THE INVENTION

Figure 1:
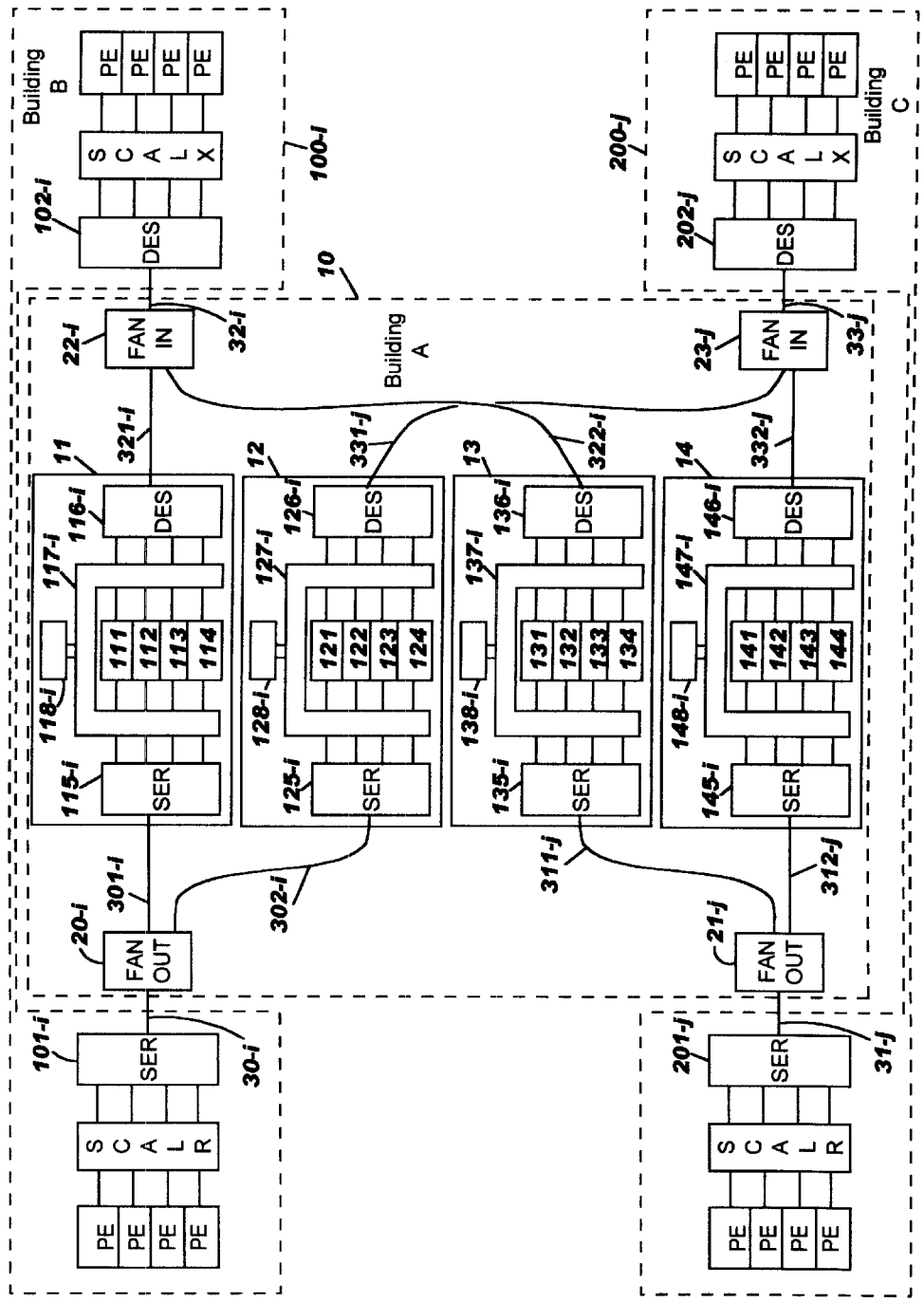
FIG. 1 illustrates the basic concept of the cell routing and transport process in accordance with the present invention.

With respect to FIG. 1, there is shown the general architecture of the switching system which illustrates the transport process in accordance with the present invention. There is shown a switch core 10 comprising a set of switching structures which are generally mounted in port expansion, with a set of Switch Core Access Layer (SCAL) elements 100-i, 200-j which are remotely distributed with respect to the switch core and which permit the attachment of a set of Protocol Adapters or Protocol Engines (PEs) to one port of the switch core. The whole set of elements constitutes an effective switching architecture which can extend over several premises in one industrial area. For instance, and with respect to the FIGURE, it is assumed that the SCAL 100-i (providing an access to the port i) can be located within a building B, while SCAL 200-j is located in a building C that can be remote with respect to the switch core 10 located in one centralized area (building A).

For explanation purposes, switch core 10 comprises a set of pxp elementary switching structures which are mounted in port expansion mode which permits multiplying by p the number of ports. The FIGURE illustrates a port expansion architecture with a factor of expansion which is fixed at 2. Therefore, four elementary switching structures 11–14, all identical, having sixteen input and output ports each (the reference to any port being i in general) are connected by means of fan-out circuits 20-i and 21-j, and fan-in circuits 22-i and 23-j. More particularly, switching structures 11 and 12 receive the cells provided by fan-out circuit 20-i, while switching structures 13 and 14 receive the cells that are transmitted by fan-out circuit 21-j. On the other side, the output ports of switching structures 11 and 13 are merged via a fan-in circuit 22-i, and those of switching structures 12 and 14 are merged via fan-in circuit 23-j. Four sets of communications links 30-i, 31-j, 32-i, and 33-j are used for providing the connection between the SCALs and the switch core 10. It should be noticed that each of these communications links constitute a set of k parallel serial links which can extend over several hundreds of meters. This allows the possibility of k connections between the SCALs and the switch core since it is possible to locate the different elements in different physical areas, in accordance with the locations of the existing particular Protocol Engines or Adapters.

In the preferred embodiment of the invention, links 30-i and 32-i permit the connection of the SCAL 100-i to the switch core 10. Similarly, links 31-j and 33-j permit the connection of the SCAL 200-j to the switch core 10.

Each individual switching structure 11, 12, 13, 14 respectively, comprises a set of m switching modules (with m=4 in the exemplary embodiment) 111–114, 121–124, 131–134, 141–144, respectively; a set of deserializing units 115-i, 125-i, 135-i, 145-1, respectively; and a set of serializing units 116-i, 126-i, 136-i, 146-i, respectively. Additionally, each switching structure 11, 12, 13, 14, comprises a routing control circuit 117-i, 127-i, 137-i, 147-i, respectively, associated with a storage 118-i, 128-i, 138-i, 148-i, respectively.

The process operates as follows:

When the cell is delivered by the Protocol Engine being located in area B; the latter containing a Switch Routing Header (SRH) characteristic of the destination of the cell, i.e. the identity of one or several Protocol Engines which will have to receive the considered cell as well as the payload. The SRH particularly contains a routing index which is a name of a particular multicast tree which is characteristic of the connection to which this cell belongs. It should be noted that, in accordance with the present invention, this multicast tree does not permit, per se, the internal routing process within the switch core. However, this internal routing process can be achieved by means of the routing control circuits 117–147, in association with the corresponding storages, after the routing index is decoded. This important point presents the substantial advantage of decreasing the number of bits used by the routing index, while allowing a great number of multicast trees.

When the cell enters the receive part of the SCAL 100-i, an additional field is introduced within the cell, the number of bits of which is equal to the number of ports in each switching structure 11–14. In the present invention, as each switching structure contains 16 input and output ports, the additional field which is introduced, called the bitmap, contains 16 bits. This two-byte additional field is created but does not yet carry any relevant information.

As mentioned above, communication link 30-i is in the form of a bundle of k serial links, the number k being fixed in accordance with the capabilities of the technology, i.e., as a function of the technology and the bandwidth which is required on the bundle 30-i. In the preferred embodiment of the invention, bundle 30-i comprises four serial links each operating at 500 Mbps, thus providing an overall bandwidth of 2 Gbps.

The SCAL element 100-i receives the cell (including the bitmap), and separates the cell into k identical portions, or logical units, each one being assigned to one specific serial link in the bundle. This is achieved by the use of serializing unit 101-i, the latter comprising k elementary serializers. It should be noted that some padding may be appropriate in order to fill the blanks left by the division by k of the cell being transported. However, such techniques are well known and will not be further described. Therefore there is provided four logical units, each comprising a sequence of bytes coming from the entire cell which is to be transported.

The four logical units that form the cell can then be transported through several hundreds of meters by means of the appropriate serial links (generally a coaxial cable or optical fibers), to the switch core 10, where they arrive to the fan-out circuit 20-i which duplicates each logical unit so that each one is presented at the input port of the associated switching structure 11 and 12 respectively. The k logical units that form a cell are received by deserializing units 115-i and 125-i, each of which comprises a set of k elementary deserializers. The set of k LUs can then be forwarded to the routing control circuits 117-i and 127-i which both reconstitute the original cell in their respective switching structure. It should be noted that, at this point of the process, the two cells which are rebuilt are strictly identical.

Each routing control circuit 117-i, 127-i, respectively extracts the routing index contained in the Switch Routing Header (SRH), uses the routing index for addressing the associated storage 118-i, 128-i, respectively, and fills the bitmap field with the values being returned from the storage; these values being characteristic of the local configuration of the related multicast tree. Therefore, these bitmaps can be used for controlling the internal routing process inside the corresponding switching structure. Therefore, from that point, it appears that the two cells (including the bitmap) are no longer identical. In addition, in the preferred embodiment of the invention which is particularly necessary when the switching structures are mounted in a port expansion mode, the addressing of the storage associated with each routing control circuit provides an additional bit which can be used at that particular point for dropping the cell if the latter must be stopped at this part of the multicast tree. This is particularly the case when the cell being transported corresponds to a unicast cell, or a multicast cell for which all the target Protocol Engines are connected to the same switching structure.

Then, the routing control device still separates the cell in m different logical units for providing those to the corresponding individual switching modules included in the switching structure. This is the case when the individual switching modules are connected in a speed expansion mode, which is fully described in the above-mentioned European patent applications, the disclosures of which are incorporated by reference herein.

Obviously, the particular Logical Unit that will be conveyed to the master switching module (as described in the above-mentioned applications) will have to carry the bitmap, since the latter will be used for simultaneously controlling the four switching modules.

From this instant, the cell can be routed to the appropriate output port with possibly a duplication in accordance with the information carried by the bitmap. This is the case in the multicasting of the cell since numerous identical cells will be provided at different output ports, and at different instants.

Considering one of these multicasted cells, the process continues as follows:

The cell enters in the routing control circuit 117-i associated with the target output port, and the routing control circuit again retrieves the routing index carried by the SRH in order to address storage 118-i in order to get another value of the bitmap which is characteristic of the routing being performed by the transmit part of the SCAL 100-i, for appropriate routing (with a possible multicast) toward the target Protocol Adapter or Engine. It should be noted that the same routing index was used several times (in the example considered) for getting the appropriate bitmap, and each addressing can return different values in accordance with the great variety of multicast trees that are possible.

Therefore, with this invention, a limited number of bits of the routing index achieves wide possibilities for multicasting without incurring too much overhead.

From routing control circuit 117-i (for i=0 to 15 in accordance with the particular multicast operation being applied to this cell), the cell is then forwarded to the serializer 116-i. The latter is used for dividing the cell in k logical units, each of the k logical units being transported by a corresponding serial link among the k links forming bundle 321-i. In addition to the introduction of each LU in a serial link, each serializer 116-i, 126-i, 136-i, 146-i, respectively, introduces a comma character inside the empty cells so that the boundary of the empty logical unit can be clearly distinguished.

Each fan-in circuit 22-i, 23-j receives the data coming from two bundles 321-i, 322-i and 331-j, 332-j, respectively, and detects on the k links of every bundle the comma character (the same appearing on each link of the bundle) in order to recognize an empty cell, which is essential for achieving the merging of the two bundles. Obviously, an appropriate synchronization system is introduced between switching structure 11 and switching structure 13 so that, at the input of fan-in circuit 22-i, only one data cell will appear at a given time.

On output bundle 32-i (formed of k serial links), the cells coming from the two switching structures 11 and 13 are transported. In accordance with the present invention, this transport is achieved over long lines, coaxial cable or optical fibers, to distances which can extend beyond several hundreds of meters, so that the SCAL element 100-i that will receive the cells can actually be located in another physical area with respect to the switch fabric. The k logical units that form a cell are received by deserialing unit 102-i, which comprises a set of k elementary deserializers, the set of k LUs are then forwarded to the transmit part of the SCAL which reconstitutes the original cell.

Obviously, if the cell has been multicast several times, e.g. arriving at different ports of either structure 11 or structure 12, the same cell will be processed in a similar fashion as was described above, possibly at different instants before it can be delivered to the appropriate SCAL directions.

From this instant, each SCAL that receives the cell, e.g., SCAL 100-i, will use the value carried by the bitmap in order to route the cell to the appropriate Protocol Engines, and possibly perform an additional and final multicasting operation.

Before forwarding the cell to the appropriate Protocol Engines, the transmit part of the SCAL 100-i removes the bitmap field in order that the cell can be reconstituted and become identical to the one that was transmitted by the source Protocol Engine, so that the cell can be finally transported, routed and duplicated as many times as necessary.

What is claimed is:

1. A method for routing a data cell in a self-routing switch fabric having a central switching structure and distributed Switch Core Access Layer (SCAL) elements that permit attachment of protocol adapters to the switch fabric; said method comprising the steps of:

(a) in the receive part of each distributed SCAL:

dividing the cell into a set of k logical units in order to permit the transport of the cell to the centralized switching structure through a set of k serialized links;

introducing a set of additional bytes into one of said logical units, said bytes forming a bitmap field for carrying a bitmap which is used for performing routing and multicast operations on the cell;

introducing in each logical unit a comma character in accordance with the 8B/10B coding process in every empty cell;

(b) in the centralized switching structure:
- deserializing each coded logical unit in order to reconstitute the data cell;
- accessing a first routing storage in order to fill said bitmap field with a first bitmap value that will be used for controlling the routing process inside said switching structure;
- assessing a second routing storage at the output of the switching structure, in order to fill said bitmap field with a second bitmap value;
- dividing the data cell into a set of k logical units in order to prepare a serialization through k serial links and performing a similar 8B/10B coding process;

(c) in the transmit part of the distributed SCAL receiving the serialized logical units:
- deserializing each coded logical unit in order to reconstitute the data cell;
- merging the coded logical unit by means of said comma character introduced into said switching structure;
- suppressing the said additional bytes in order to reconstitute the original cell that was received at the input point of the switch fabric.

2. The method for routing in accordance with claim 1 further comprising the step of accessing a third routing table in the transmit part of each SCAL element in order to increase the multicasting capabilities of the switch fabric.

3. The method for routing in accordance with claim 2 further comprising the steps of introducing two different comma characters into the 8B/10B coding process performed at the output of said switching structure whereby a flow control process is permitted.

4. A system for routing a data cell in a self-routing switch fabric comprising a central switching structure and a plurality of distributed Switch Core Access Layer (SCAL) elements that permit attachment of protocol adapters to the switch fabric; said system comprising:

(a) in the receive part of each distributed SCAL:
- a serializer circuit for dividing the cell into a set of k logical units in order to permit the transport of the cell to the centralized switching structure through a set of k serialized links;
- means for formatting the k logical units by introducing a plurality of additional bytes into one of said logical units, said bytes forming a bitmap field for carrying a bitmap which is used for performing routing and multicast operations on the cell;
- coding means for introducing in each logical unit a comma character in accordance with the 8B/10B coding process in every empty cell;

(b) in the centralized switching structure:
- a deserializer circuit for deserializing each coded logical unit in order to reconstitute the data cell;
- a first routing control circuit for accessing a first routing storage in order to fill said bitmap field with a first bitmap value that will be used for controlling the routing process inside said switching structure;
- a second routing control circuit for assessing a second routing storage at the output of the switching structure, in order to fill said bitmap field with a second bitmap value;
- a serializer circuit for dividing the data cell into a set of k logical units in order to prepare a serialization through k serial links and performing a similar 8B/10B coding process;

(c) in the transmit part of the distributed SCAL receiving the serialized logical units:
- a deserializer circuit for deserializing each coded logical unit in order to reconstitute the data cell;
- means for merging the coded logical unit by means of said comma character introduced into said switching structure;
- means for suppressing the said additional bytes in order to reconstitute the original cell that was received at the input point of the switch fabric.

* * * * *